United States Patent [19]

Armstrong et al.

[11] 4,375,716
[45] Mar. 8, 1983

[54] METHOD FOR PRECISE FITTING OF VEHICLE BODY CLOSURE

[75] Inventors: Joseph Armstrong, Farmington Hills; Robert L. Gordon, Rochester; William R. Walsh, Ortonville; Jack H. King, Sr., Rochester, all of Mich.

[73] Assignee: General Motors Corporation, Detroit, Mich.

[21] Appl. No.: 240,174

[22] Filed: Mar. 3, 1981

[51] Int. Cl.³ .............................................. B23Q 17/00
[52] U.S. Cl. ...................................... 29/404; 29/434; 29/464; 29/469; 49/400
[58] Field of Search ............... 29/464, 404, 407, 469, 29/434, 526 R; 180/89.1; 296/194; 49/400, 401

[56] References Cited

U.S. PATENT DOCUMENTS

| | | | |
|---|---|---|---|
| 2,122,007 | 6/1938 | Kearney | 49/400 X |
| 2,138,523 | 11/1938 | Haberstump | 49/400 X |
| 2,163,323 | 6/1939 | Howe | 49/400 X |
| 2,332,858 | 10/1943 | Komenda | 49/400 |
| 2,481,862 | 9/1949 | Muller et al. | 29/434 |
| 3,059,328 | 10/1962 | Krause | 29/404 |
| 3,254,399 | 6/1966 | Zahuranec | 29/464 X |
| 3,601,883 | 8/1971 | Arlauskas | 29/434 |
| 3,613,203 | 10/1971 | Allds | 29/434 X |
| 3,713,203 | 1/1973 | Fanslow | 29/464 X |
| 4,186,476 | 2/1980 | Mair et al. | 29/464 X |

*Primary Examiner*—Charlie T. Moon
*Attorney, Agent, or Firm*—Charles E. Leahy

[57] ABSTRACT

A method of precisely mounting a closure on a vehicle body so that the appearance features of the closure and the body are precisely mated when the closure is closed comprises the steps of attaching a first hinge link to the closure, making a net hole in the second hinge link at a precise location relative a certain appearance feature of the closure, and then installing a fastener between the net hole of the second hinge link and a mating net hole previously provided in the body at a precise location relative a certain appearance feature of the body. More particularly, a door hinge link is mounted on a transverse door surface at a location which establishes the hinge axis at a precise dimension transversely of the door outer surface and establishes the hinge at a precise location vertically from the top and bottom edges of the door. While the hinge is held at a simulated closed position, a net hole is pierced in the second hinge link at a precise longitudinal position relative the trailing and leading door edges and a precise vertical position relative the top and bottom edges of the door. An anchor plate having a same size net hole as the second hinge link pierced net hole is attached to the body hinge pillar at a precise distance in the longitudinal and vertical directions relative the door opening edges so that alignment of the net holes by installation of a bolt therethrough establishes a precise door mounting location in which the adjacent edges, surfaces and feature lines of the body and the door are precisely aligned and spaced relative one another.

4 Claims, 9 Drawing Figures

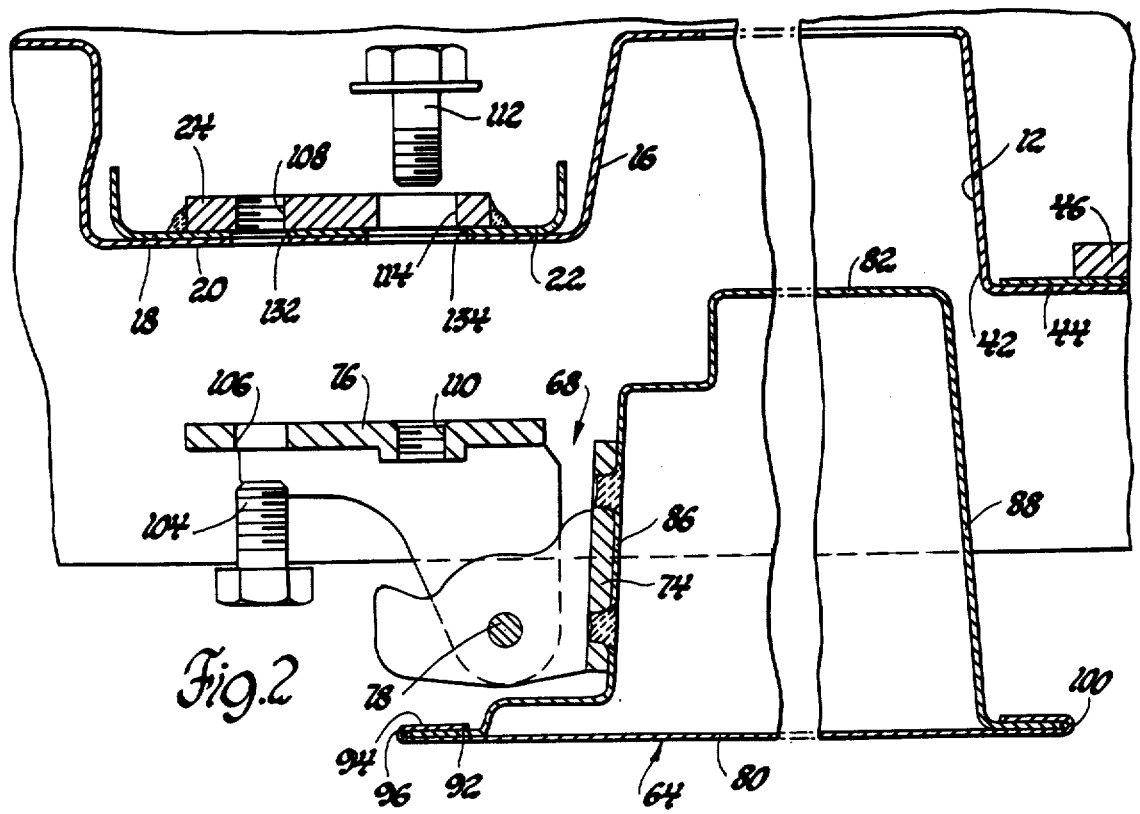
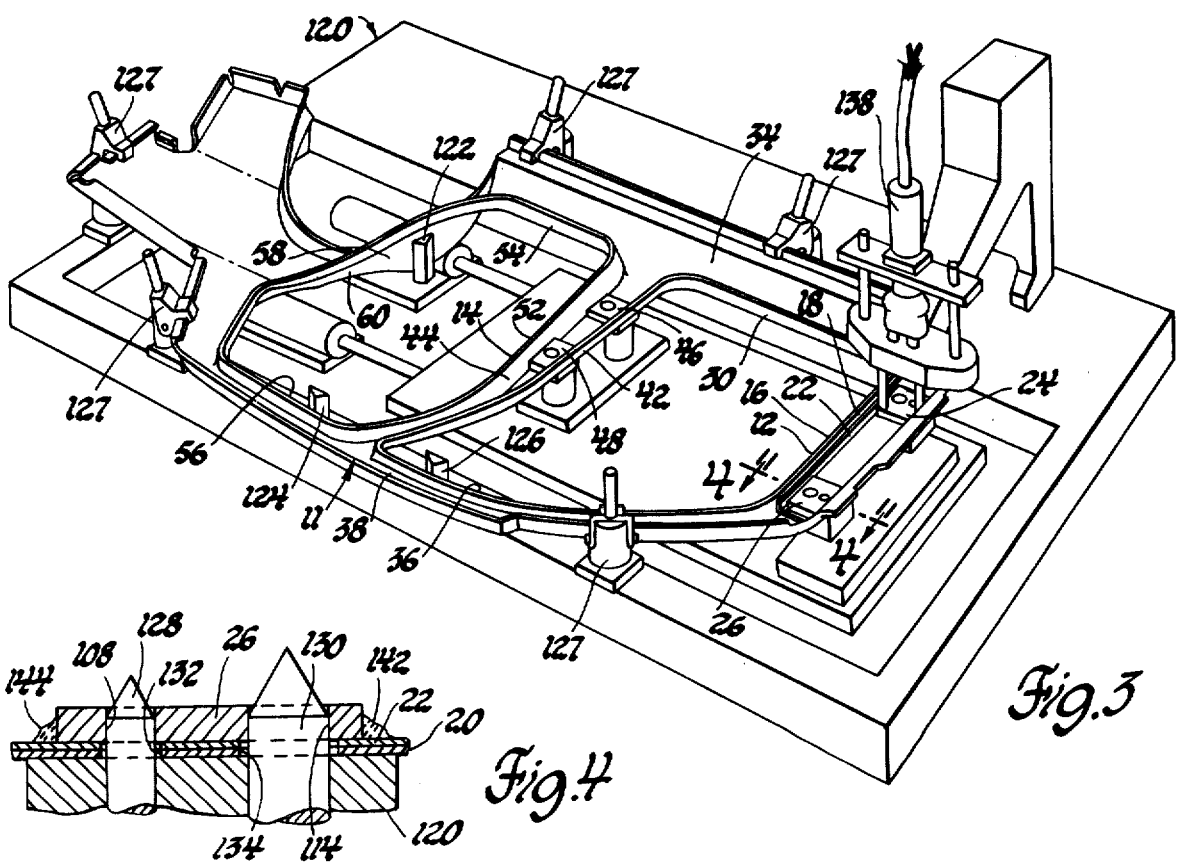

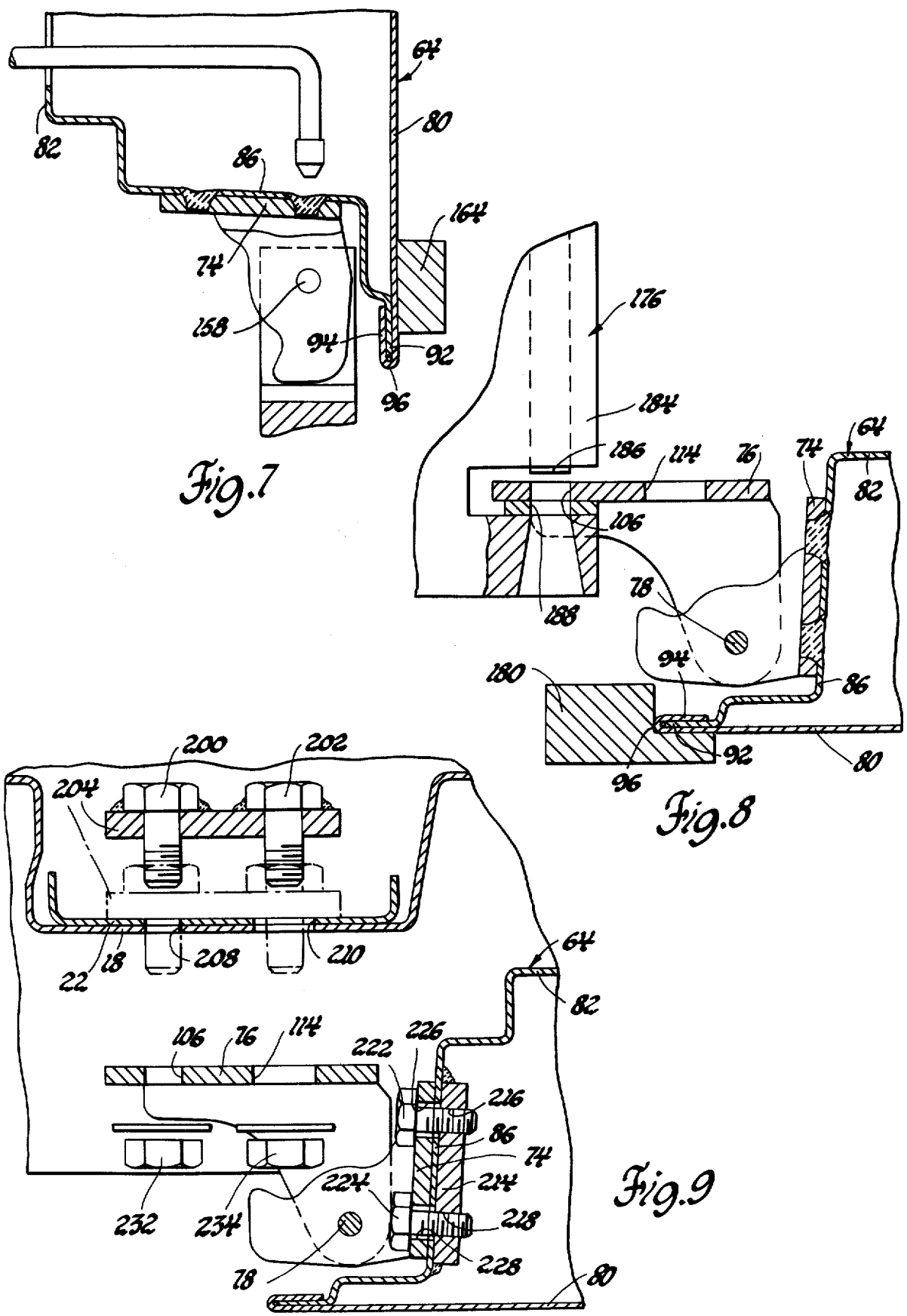

METHOD FOR PRECISE FITTING OF VEHICLE BODY CLOSURE

The invention relates to a method by which a vehicle body closure, such as a door, may be precisely hinged to the vehicle body with the adjacent appearance features of the closure and the body precisely aligned and spaced relative one another.

BACKGROUND OF THE INVENTION

It is well known in motor vehicles to have a door which is hingedly mounted within a door opening for swinging movement between open and closed positions. The door opening is defined by a hinge pillar at the front of the door opening, a latch pillar at the rear, a roof rail at the top, and a sill at the bottom. Upper and lower hinges are bolted or welded to the door and to the hinge pillar to mount the door for swinging movement. Precise mounting of upper and lower hinges on the door and the pillar establish the top and bottom edges of the door at a uniform spaced position relative the roof rail sill and align the adjacent window sills and exterior sculptured feature lines as well as establish the door at a precise longitudinal position on the body so that the trailing edge of the door is properly spaced from the latch pillar. A latch and a striker act between the latch pillar and the door to latch the door and precisely establish the transverse position of the door trailing edge to achieve flush and aligned relation of the adjacent outer surfaces of the body and the door. In two-door vehicle bodies where the leading edge of the door is adjacent the fender, the fender can be shimmed transversely of the vehicle to mate the outer surface of the fender with the outer surface of the door. In four-door vehicles, the trailing edge of the front door is established transversely by the latch and striker so that the outer surface of the front door is precisely aligned with the outer surface of the rear door.

Conventional motor vehicle doors are constructed of a stamped steel outer panel which is formed to the desired outer contour of the vehicle body and a stamped steel inner panel having a transverse extending hinge mounting surface at the forward end of the door. The outermost edge of the inner panel hinge mounting surface is bent forwardly to define a flange which lies face-to-face against the outer panel. The inner and outer panels are joined together by hem flanging the edge of the outer panel over the flange of the inner panel. The steps of stamping the outer panel and hem flanging the outer panel over the inner panel are effective to provide a door of consistently controlled outer dimensions so that the appearance features of the door such as the edges of the door, the outer surface contour and the location of the windowsill and other exterior sculptured feature lines are accurately and repeatedly located relative one another. However, a recognized shortcoming of this conventional door construction is that the longitudinal positioning of the transverse extending hinge mounting surface is subject to some degree of variation with respect to the appearance feature of the door because of various factors such as metal springback, etc.

The motor vehicle body panels which define the door opening are conventionally stamped from a single sheet of steel or are comprised by welding separate stampings together. In either case, the vehicle body constructed thereby is known to provide vehicle body door openings of consistently controlled dimension so that the appearance features of the door opening, such as the edges and outer surfaces of the pillars, roof rail, and sill are located identically on all bodies.

The aforedescribed consistent and reliable manufacture of the vehicle body opening and the door outer panel assure that the door is capable of mounting within the door opening with the appearance features of the door precisely aligned, mated and spaced relative the adjacent appearance features of the body.

The door is conventionally mounted on the vehicle body by upper and lower hinges, each hinge having a first link attached to the transverse extending surface of the door and a second link connected to the longitudinally extending surface of the body pillar. The hinge links have bolt holes which are slotted or otherwise oversized so that the door may be adjusted in the vertical, longitudinal, and transverse directions to achieve a precise alignment of the door with the vehicle body.

Alignment and centering of the door in the door opening is obtained through alternating steps of adjustment and inspection. More specifically, it is common practice for the assembly worker to employ his skill and experience in conjunction with gauge blocks or the like in estimating an initial attachment of the hinges to the body pillar. The door is then inspected to observe any disparity in alignment and centering of the door appearance features relative the door appearance features. The bolts are then loosened and adjusted to bring the door to a better fit. This procedure of alternating inspection and adjustment is repeated until the desired door fit is obtained.

In other installations the hinge may be welded to the door or vehicle body and adjustment of the door in the door opening is achieved by holding the door precisely within the opening while making the welded connection.

BRIEF SUMMARY OF THE INVENTION

The feature, object and advantage of the present invention resides in the provision of an assembly method by which vehicle body closures, such as doors, may be assembled for automatic precise alignment and centering of their respective appearance features relative one another without trial and error adjustment. More particularly the invention enables the use of net sized attaching holes in the door hinges instead of slotted or oversized holes.

According to the invention, a method of precisely mounting a closure on a vehicle body so that the appearance features of the closure and body are precisely mated when the closure is closed comprises the steps of attaching a first hinge link to the closure, making a net hole in the second hinge link at a precise location relative a certain appearance feature of the closure, and then installing a fastener between the net hole of the second hinge link and a mating fastener previously provided in the body at a precise location relative a certain appearance feature of the body. More particularly, the door hinge link is mounted on the transverse extending mounting surface of the door at a precise location which establishes the hinge axis at a precise dimension transversely of the door panel outer surface and establishes the hinges at a precise location vertically from the top and bottom edges of the door. While the hinge is held at a simulated closed position, a net hole is pierced in the second hinge link at a precise longitudinal position relative the trailing and leading door edges and a precise vertical position relative the top and bottom edges of the door. An anchor plate having a net hole therein of the same size as the net hole pierced in the second hinge link is attached to the vehicle body hinge pillar at a precise distance in the longitudinal and vertical directions relative the body panel edges defining the door opening so that alignment of the door hinge link net hole and the anchor plate net hole establish a precise location in which the edges, surfaces and feature lines of the body panel and the door are precisely aligned and spaced relative one another. A bolt is installed through the aligned net holes of the door hinge link and the anchor plate to establish the precise mounting location. Additional bolts are installed through additional holes in the door hinge link and the body anchor plate to complete the door installation.

DESCRIPTION OF THE DRAWINGS

These and other features, objects and advantages of the invention will become apparent upon consideration of the specification and the appended drawings in which:

FIG. 2 is a section taken in the direction of arrows 2—2 of FIG. 1 showing one of the hinges welded to the door and aligned for attachment to an anchor plate mounted on the vehicle body pillar;

FIG. 3 is a perspective view showing a laydown fixture in which anchor plates are welded at a precise location on the hinge pillars of the vehicle body;

FIG. 4 is a sectional view taken in the direction of arrows 4—4 of FIG. 3 showing locating pins at the laydown fixture which position the anchor plates for welding at a precise location on the pillars of the vehicle body;

FIG. 7 is an enlarged sectional view taken in the direction of arrows 7—7 of FIG. 6 and showing the locating fixture for positioning the hinge precisely in the transverse direction relative the outer surface of the door;

FIG. 8 is a partial fragmentary view of the door showing the piercing fixture for making a net attaching hole in the second hinge link; and FIG. 9 is a view similar to FIG. 2 but showing a second embodiment of the invention.

DESCRIPTION OF THE PREFERRED EMBODIMENT

Figure 1:
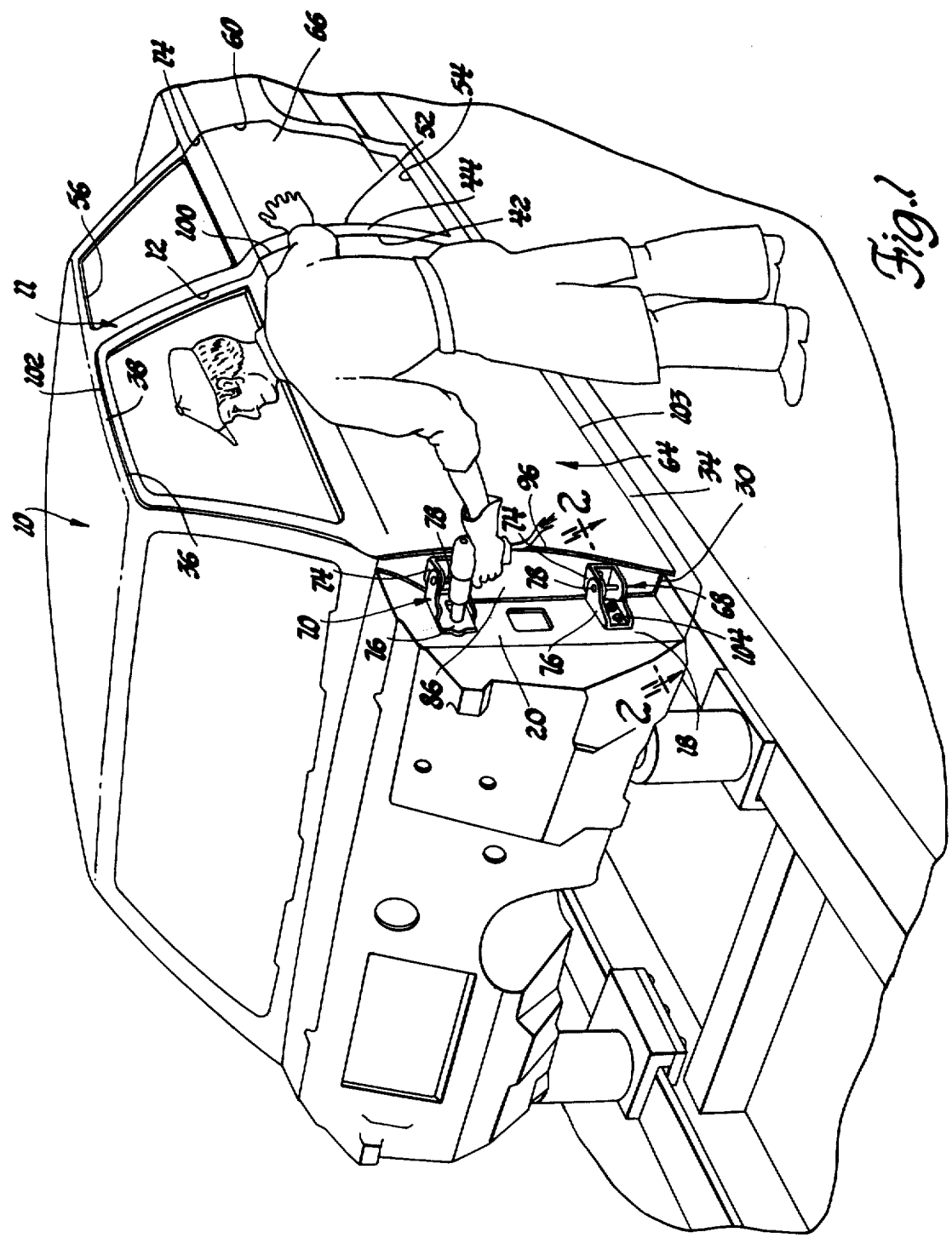
FIG. 1 is a perspective view of a vehicle body having a door opening and a door mounted for swinging movement by an upper and lower hinge.

Referring to FIG. 1, there is shown a four-door vehicle body generally indicated at 10 which is comprised of a number of welded together stamped sheet metal panels. FIGS. 1 and 3 show that the side ring 11 of the vehicle body is provided by a single piece sheet metal stamping or may be provided by a plurality of sheet metal stampings which are welded together. In either case, the side ring 11 of the vehicle body 10 includes a front door opening 12 and a rear door opening 14. The front door opening 12 has a forward edge 16 defined by a hinge pillar 18. The hinge pillar 18 has a longitudinally extending mounting surface 20 strengthened by a welded-in reinforcement 22 and adapted to mount upper and lower door hinges via a lower anchor plate 24 and an upper anchor plate 26 as will be discussed more particularly hereinafter. The front door opening 12 also has a bottom edge 30 defined by a sill 34 and a top edge 36 defined by a roof rail 38. The rear edge 42 of front door opening 12 is defined by a center pillar 44 which mounts a striker, not shown, for latching the front door in the closed position and also provides a longitudinally extending mounting surface upon which a lower anchor plate 46 and an upper anchor plate 48 are suitably mounted for attaching the rear door hinges as will be discussed hereinafter. The rear door opening 14 likewise includes a front edge 52 defined by the center pillar 44, a bottom edge 54 defined by sill 34, a top edge 56 defined by roof rail 38, and a rear edge 58 defined by a latch pillar 60.

As best seen in FIG. 1, a front door 64 is provided for hinged mounting in the front door opening 12 and a rear door 66 is provided for hinged mounting in the rear door opening 14. The front door 64 is mounted on the hinge pillar 18 by a lower hinge assembly 68 and an upper hinge assembly 70. The lower hinge assembly 68 includes a first hinge link 74 which is attached to the front door 64, a second hinge link 76 which is attached to the hinge pillar 18, and a hinge pin 78 which acts between the first link 74 and second link 76 to define an axis of pivotal door movement between the closed position shown in FIG. 1 and an open position, not shown. The upper hinge assembly 70 is similarly constructed and has like elements designated by like numerals. At least one of the hinges has a suitable hold-open mechanism acting between the links so that the door will be maintained in an open position. The rear door 66 is mounted in the rear door opening 14 by similar upper and lower hinges, not shown.

As seen in FIG. 2, a typical door 64 includes an outer panel 80 and an inner panel 82. The inner panel 82 is a sheet metal stamping which includes a transverse extending hinge mounting surface 86 at the forward end and a transverse extending latch mounting surface 88 at the rearward end. The forward edge of the inner panel 82 is bent forwardly to define a flange 92 which lies face-to-face against the outer panel 80. The forward edge of the outer panel 80 is bent over the flange 92 of the inner panel 82 to define a hem flange 94 which joins together the inner and outer panels and defines the leading edge 96 of the door 64. A similar flanging of the rearward, top and bottom edges of the outer panel 80 over flanged edges of the inner panel 82 defines the trailing edge 100 of the door 64 as well as a top edge 102 and bottom edge 103.

The stamping of the outer panel 80 and the assembly of the door 64 by hem flanging of the outer panel 80 over the inner panel 82 is effective to provide a door 64 of consistently controlled dimension so that the exterior appearance features of the door, such as the door edges, the outer surface contour, and the location of the windowsill and other exterior feature lines are accurately and repeatedly located relative one another during large quantity mass production of the doors. However, it is well known that the springback of the stamped steel of the inner panel 82 and other factors results in some variation in the longitudinal position of the transverse extending hinge mounting surface 86 relative the leading edge 96 and trailing edge 100 of the door.

Referring to FIG. 2, it is seen that the first hinge link 74 is attached to the transverse extending hinge mounting surface 86 of the door 64 by welding. The second hinge link 76 is attached to the longitudinal extending mounting surface 20 of the hinge pillar 18 by a bolt 104 which extends through a hole 106 of second hinge link 76 and is threadedly received in a threaded hole 108 of the anchor plate 24. An additional bolt 112 extends through an oversize hole 114 of the anchor plate 24 and is threadedly received in a threaded hole 110 of the second hinge link 76. Referring to FIG. 2, it will be seen that the variation in the longitudinal location of the transverse extending hinge mounting surface 86 of the door 64 can be compensated for by a precise longitudinal attachment of the second hinge link 76 to the pillar 18. Likewise it will be appreciated that a precise vertical placement of the door 64 within the door opening 12 will be achieved by precise vertical location of the hinges and their respective attachments onto the door 64 and the pillar 18. Still further, it will be understood that the transverse location of the door 64 will be controlled by precise attachment of the first hinge link 74 onto the transverse extending hinge mounting surface 86 of the door.

FIGS. 3-8 discussed hereinafter disclose a method enabling precise mounting of the hinges both the door and the body pillar so that the door will be precisely centered within the door opening and the outer surface of the door will be precisely located in the transverse direction to align precisely with the adjoining surfaces of the vehicle body when the door is closed.

FIGS. 3 and 4 show a laydown fixture 120 which receives the body side ring 11 to enable precise welded attachment of the lower anchor plates to the pillars. The laydown fixture 120 has locating devices 122, 124, and 126 which position the body side ring 11 in the vertical and longitudinal directions relative the door openings and a plurality of clamps 127 to hold the side ring 11 at the precise position. Referring to FIG. 4, it is seen that the laydown fixture 120 also has locating pins 128 and 130 which project through oversized holes 132 and 134 in the pillar 18 and the reinforcement 22. The anchor plates 24, 26, 46 and 48 are loaded onto the locating pins 128 and 130 so that the threaded hole 108 of the anchor plates are precisely located in the longitudinal and vertical directions relative the door openings. A robotically operated welder 138 is associated with the laydown fixture 120 to weld the anchor plates to the pillars as indicated by weld beads 142 and 144 shown in FIG. 4. The body side ring 11 is unloaded from the laydown fixture 120 and conventionally assembled with additional vehicle body panels to define the vehicle body 10 shown in FIG. 1.

Figure 5:
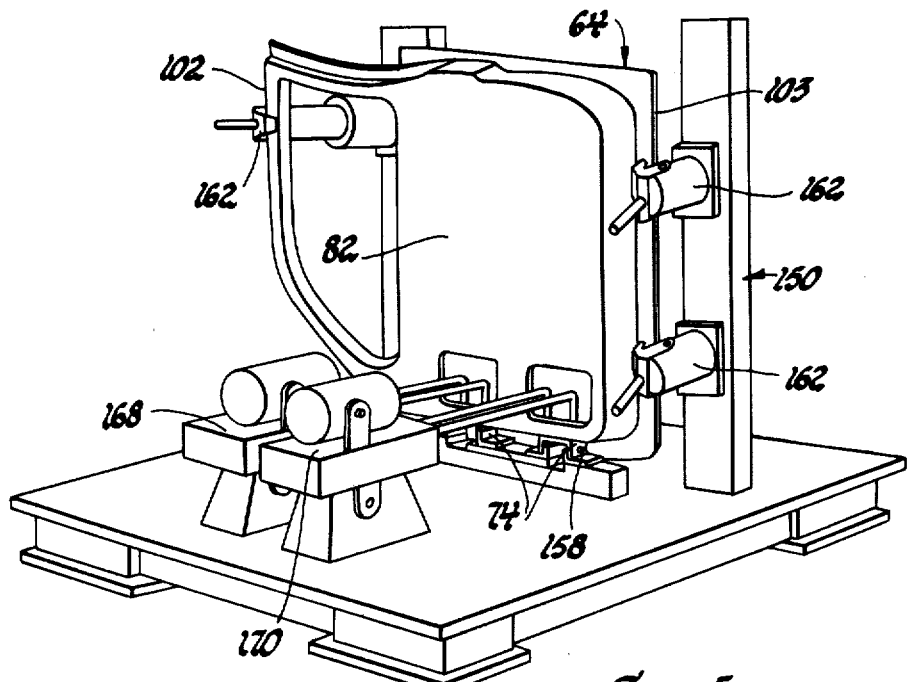
FIG. 5 is a perspective view of an assembly fixture in which the first hinge link is welded to the door at a precise transverse and vertical location relative the appearance features of the door and irrespective of variation in the longitudinal location of the transverse extending hinge mounting surface of the door.
Figure 6:
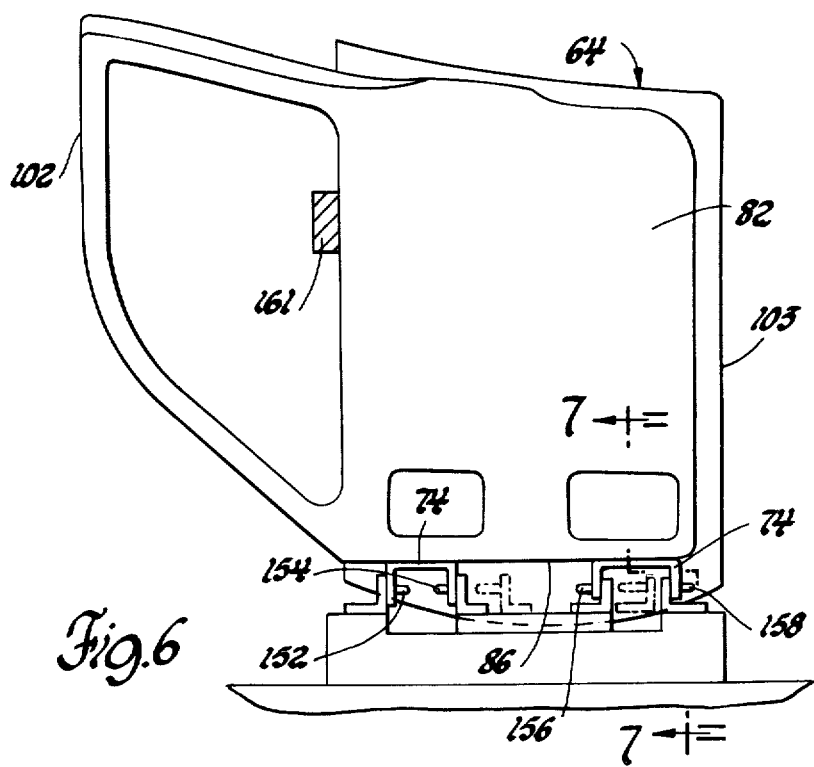
FIG. 6 is an enlarged fragmentary view corresponding to FIG. 5 and showing the locating pins which locate the hinges for welding on the door.

Referring to FIGS. 5, 6 and 7, there is shwon an assembly fixture 150 which precisely locates the first hinge links 74 of the upper and lower hinges in the vertical and transverse directions relative the appearance features of the door. As best seen in FIG. 6, assembly fixture 150 has locating pins 152, 154, 156 and 158 which extend into the hinge pin holes of the hinge links 74 to precisely align the hinge axes of the upper and lower hinges with one another. The door 64 is then loaded into the assembly fixture 150 with the transverse extending hinge mounting surface 86 resting upon the hinge links 74. A locating fixture represented schematically at 161 positions the door 64 in the vertical direction so that the hinge links 74 are precisely positioned in the vertical direction relative the top edge 102 and bottom edge 103 of the door. FIG. 7 shows a schematically represented locating fixture 164 which precisely locates the door in the transverse direction relative the hinge axes of the hinge links 74. Clamps 162 shown in FIG. 5 support the door 64 at the precise location on the hinge link 74. As seen in FIG. 5, robotically operated welders 168 and 170 reach through access openings provided in the door inner panel to weld the hinge link 74 to the transverse extending hinge mounting surface 86 at the precise location established by the assembly fixture 150.

Subsequent to the precise welded attachment of the hinge links 74 to the door 64 as shown in FIGS. 5, 6 and 7, the door 64 is removed from the assembly fixture 150 and the second hinge links 76 of the lower hinge 68 and upper hinge 70 are attached thereto by driving the hinge pins 78 through the aligned hinge holes of the first hinge links 74 and second hinge links 76.

Referring to FIG. 8, there is shown a piercing fixture generally designated 176 for piercing the net attaching hole 106 through the second hinge link 76. The door 64 is supported by a schematically represented locating block 180 which engages the surface of the door outer panel 80 and the leading edge 96 of the door. An additional locating block, not shown, precisely locates the door in the vertical direction relative the top edge 102 and bottom edge 103 of the door. Additional clamping and locating fixtures, not shown, hold the second hinge link 76 at a rotary position simulating the closed position of the door 64. A piercing tool, schematically illustrated at 184, is precisely positioned by the piercing fixture 176 and includes a punch 186 and a die 188 which cooperate to provide the net attaching hole 106 at a precise location in the longitudinal and vertical direction relative the appearance surfaces of the door 64.

Referring again to FIG. 1, it will be understood that the door 64 is attached to the vehicle body 10 by positioning the door 64 within the door opening 12 and then installing the attaching bolts 104 through the aligned net attaching hole 106 of the second hinge link 76 and the threaded hole 108 of the anchor plates 24 and 26. An additional attaching bolt 112 is then driven through the oversized anchor plate hole 114 and into the hinge link threaded hole 110. The hole 114 in the anchor plate is slotted or otherwise oversized so that the alignment of hinge link net attaching hole 106 with the anchor plate threaded hole 108 by the bolt 104 establishes the location of the door and the additional bolt 112 completes the attachment at that precise location.

Referring again to FIG. 1, it will be understood that because the net attaching hole 106 of the hinge link 76 is located precisely in the longitudinal direction with respect to the leading and trailing edges of the door, and because the threaded hole 108 of the anchor plate is precisely located in the longitudinal direction with respect to the leading and trailing edges of the door opening 12, the door 64 will be automatically established at a precise longitudinal position within the door opening 12 in which the vertical edges of the door and the vehicle body are precisely spaced and aligned relative one another. Furthermore, it will be understood that the precise location of the welded attachment of the first hinge link 74 to the transverse extending mounting surface 86 of the door 64 is effective to establish a precise transverse location of the door on the vehicle body. A front fender is conventionally bolted to the vehicle body 10 and shimmed transversely of the body to mate the outer surface contour of the fender with the outer surface contour of the door outer panel 80. Furthermore, it will be understood that because the net attaching hole 106 of the hinge is located precisely in the vertical direction with respect to the top and bottom edges of the door, and because the threaded hole 108 of the anchor plate is precisely located in the vertical direction with respect to the top and bottom edges of the door opening, the door 64 will be automatically established at a precise mounted relationship with the top and bottom edges of the door spaced precisely from the top and bottom edges defining the door opening.

Referring to FIG. 9, there is shown an alternate arrangement for precise attachment of the hinge to the door and for the precise longitudinal connection between the hinge and the pillar. Referring to FIG. 9, it is seen that the hinge attaching bolts 200 and 202 are installed through mating apertures of a heavy gauge anchor plate 204. The bolts 200 and 202 are preferably welded to the anchor plate for convenient handling during the assembly procedure. The pillar 18 and the reinforcement 22 have a net sized attachment hole 208 which is pierced, drilled or otherwise formed therein at a precise longitudinal and vertical location while the vehicle body side ring 11 is precisely positioned in a laydown side fixture similar to that shown in FIG. 3. The oversized hole 210 for the bolt 202 may be made in this same fixture or may be previously provided during stamping of the pillar 18 and reinforcement 22. The anchor plate 204 together with the bolts 200 and 202 are installed through the net sized attachment hole 208 and the oversized hole 210 to the phantom line indicated position of FIG. 9 where the anchor plate 204 is preferably tack welded for ease of handling during the assembly procedure.

Referring again to FIG. 9, it is seen that the first hinge link 74 is bolted to the transverse extending hinge mounting surface 86 of the door 64. A threaded attaching plate 214 is welded inside the door 64 and has threaded holes 216 and 218 which align with mating oversize holes provided in the transverse extending hinge mounting surface. The door is loaded into an assembly fixture similar to that shown in FIGS. 5 and 6 and which establishes the first hinge link 74 at a precise transverse and vertical position relative the door 64. The attaching bolts 222 and 224 are then installed through oversize holes 226 and 228 of the hinge link 74.

The second hinge link 76 is pierced as shown in FIG. 8 to provide the net attaching hole 106 in the second hinge link at a precise longitudinal and vertical position. The door is then positioned within the door opening and nut and washer assemblies 232 and 234 are driven respectively onto the bolts 200 and 202 to complete the hinge attachment of the door to the vehicle body.

While the invention has been disclosed primarily in terms of the specific embodiments shown in the drawings, it is not intended to be limited to, but rather only to the extent set forth in the appended claims. For example, the anchor plates 36 are disclosed herein as being attached to the pillars in the laydown side ring fixture. It will be understood that the anchor plates can be attached to the vehicle body at any phase during the assembly thereof, the critical factor being that the anchor plate is attached to the vehicle body at a location establishing the net attaching hole or bolt thereof at a precise location relative the appearance features of the door opening. Furthermore, it will be understood that the anchor plate, or its equivalent, may be bolted, welded or otherwise attached to the pillar in any other suitable manner.

Furthermore, it will be understood that the second hinge link 76 can be welded to the pillar 18, in which case a locating pin is employed to align the net hole 106 of the hinge with net attaching hole 208 of the pillar to properly condition the door for the welding of the hinge link 76 to the pillar 18.

It will also be appreciated that the method of closure panel attachment disclosed herein may be advantageously employed in the mounting of other vehicle body closure panels, such as the engine compartment hood and the luggage compartment lid.

The embodiments of the invention in which an exclusive property or privilege is claimed are defined as follows:

1. A method for precise mounting of a vehicle body closure and hinge within a vehicle body opening so that certain adjacent appearance features of the closure and the body are precisely mated when the closure is closed, comprising the steps of:

attaching a first hinge link of the hinge to the closure;

making a net hole in the second hinge link of the attached hinge at a precise location relative a certain appearance surface of the closure; and installing a fastener between the net hole of the second hinge link and a mating fastener previously provided in the body at a precise location relative a certain appearance feature of the body whereby the closure is mounted on the body with the certain appearance feature of the closure precisely located relative the certain appearance feature of the body.

2. A method for precise mounting of a hinge between a longitudinal extending mounting surface of a vehicle body pillar and a transverse extending hinge mounting surface of a vehicle door to achieve precise outer surface mating and edge spacing of the door appearance features relative the body panel appearance features defining the door opening comprising the steps of:

attaching a first hinge link to the transverse extending mounting surface of the door at a precise location establishing the hinge axis at the precise dimension transversely of the door panel outer surface and a precise vertical distance from a selected longitudinal extending appearance feature of the door;

making a net hole in a second hinge link of the attached hinge at precise longitudinal and vertical distances from the edges of the door;

attaching an anchor plate to the vehicle body longitudinal extending mounting surface, said anchor plate having a first fastener element and being attached to the vehicle body at a position locating the fastener element at a precise distance in the longitudinal and vertical directions relative the body panel edges defining the door opening so that mating alignment of the second hinge link net hole and the anchor plate first fastener element establish the door at a precise location in which the body panel and the door outer surfaces are mated and the edges are uniformly spaced; and installing a second fastener element in mating engagement with the first fastener element whereby the door is precisely hingedly mounted on the vehicle body.

3. A method for precise mounting of a hinge between a longitudinal extending mounting surface of a vehicle body pillar and a transverse extending hinge mounting surface of a vehicle door to achieve precise outer surface mating and edge spacing of the door appearance features relative the body panel appearance features defining the door opening comprising the steps of:

attaching a first hinge link to the transverse extending mounting surface of the door at a precise location establishing the hinge axis at the precise dimension transversely of the door panel outer surface and a precise vertical distance from a selected longitudinal extending appearance feature of the door;

piercing a net hole in a second hinge link of the attached hinge at precise longitudinal and vertical distances from the edges of the door;

attaching an anchor plate to the vehicle body longitudinal extending mounting surface, said anchor plate having a net hole therein and being attached to the vehicle body at a location establishing the anchor plate net hole at a precise distance in the longitudinal and vertical directions relative the body panel edges defining the door opening;

positioning the door within the door opening with the hinge link net hole in alignment with the anchor plate net hole to establish a precise door location in which the body panel and door outer surfaces are mated and the edges are uniformly spaced; and installing a bolt through the aligned net holes of the second hinge link and the anchor plate whereby the second hinge link is attached to the longitudinal extending mounting surface and the door is precisely hingedly mounted on the vehicle body.

4. A method for precise mounting of a hinge between a longitudinal extending mounting surface of a vehicle body pillar and a transverse extending hinge mounting surface of a vehicle door to achieve precise outer surface mating and edge spacing of the door appearance features relative the body panel appearance features defining the door opening comprising the steps of:

attaching a first hinge link to the transverse extending mounting surface of the door at a precise location establishing the hinge axis at a precise dimension transversely of the door panel outer surface and a precise vertical distance from a selected longitudinal extending appearance feature of the door;

piercing a net hole in a second hinge link of the attached hinge at precise longitudinal and vertical distances from the edges of the door;

piercing a net hole in the vehicle body longitudinal extending mounting surface at a precise distance in the longitudinal and vertical directions relative the body panel edges defining the door opening;

installing a bolt through the net hole in the longitudinal extending mounting surface;

positioning the door within the door opening with the hinge link net hole mated with the bolt so that the body panel and door outer surfaces are mated and the edges are uniformly spaced; and installing a nut upon bolt whereby the door is precisely hingedly mounted on the vehicle body.

* * * * *